(12) United States Patent
Chadwell et al.

(10) Patent No.: US 11,480,083 B2
(45) Date of Patent: Oct. 25, 2022

(54) CYLINDER HEAD WITH INTEGRATED COOLING CIRCUIT FOR USE IN INTERNAL COMBUSTION ENGINES

(71) Applicant: Southwest Research Institute, San Antonio, TX (US)

(72) Inventors: Christopher J. Chadwell, San Antonio, TX (US); Thomas E. Briggs, Jr., Helotes, TX (US)

(73) Assignee: SOUTHWEST RESEARCH INSTITUTE, San Antonio, TX (US)

(*) Notice: Subject to any disclaimer, the term of this patent is extended or adjusted under 35 U.S.C. 154(b) by 28 days.

(21) Appl. No.: 16/948,892

(22) Filed: Oct. 5, 2020

(65) Prior Publication Data

US 2022/0106894 A1  Apr. 7, 2022

(51) Int. Cl.

| F01N 3/04 | (2006.01) |
|---|---|
| F01N 5/02 | (2006.01) |
| F01P 3/02 | (2006.01) |
| F01P 3/12 | (2006.01) |
| F02F 1/40 | (2006.01) |
| F01P 11/02 | (2006.01) |
| F01P 5/10 | (2006.01) |
| F02B 39/00 | (2006.01) |

(52) U.S. Cl.
CPC .............. *F01N 3/046* (2013.01); *F01N 5/02* (2013.01); *F01P 3/02* (2013.01); *F01P 3/12* (2013.01); *F01P 5/10* (2013.01); *F01P 11/029* (2013.01); *F02B 39/005* (2013.01); *F02F 1/40* (2013.01); *F01P 2003/024* (2013.01)

(58) Field of Classification Search
CPC ... F01N 3/046; F01N 5/00; F01N 5/02; F01N 5/025; F01N 5/04; F01P 3/02; F01P 3/12; F01P 5/10; F01P 11/029; F01P 2003/024; F02B 39/005; F02F 1/40
See application file for complete search history.

(56) References Cited

U.S. PATENT DOCUMENTS

| 2014/0076292 A1* | 3/2014 | Gaiser ..................... F28F 1/36 165/100 |
|---|---|---|
| 2016/0237860 A1* | 8/2016 | Malinin ............... F01K 25/103 |
| 2017/0211457 A1* | 7/2017 | Kuhlbach ............... F02F 1/243 |

* cited by examiner

*Primary Examiner* — Jacob M Amick
(74) *Attorney, Agent, or Firm* — Grossman, Tucker, Perreault & Pfleger, PLLC

(57) ABSTRACT

A cylinder head is disclosed herein to allow for temperature control of exhaust gases exiting from an associated exhaust manifold. The cylinder head includes a combustion section that defines a plurality of combustion chambers and an exhaust manifold coupled to the combustion section. The combustion section fluidly couples to exhaust inlets defined by the exhaust manifold. The exhaust manifold includes at least one exhaust passageway in fluid communication with the exhaust inlets and in fluid communication with an exhaust outlet to receive combustion gases from the combustion section and output the same via the exhaust outlet. The exhaust manifold further includes at least one coolant passageway that at least partially surrounds the at least one exhaust passageway to pass coolant therethrough in order to draw and reject heat from exhaust gases.

23 Claims, 7 Drawing Sheets

CYLINDER HEAD WITH INTEGRATED COOLING CIRCUIT FOR USE IN INTERNAL COMBUSTION ENGINES

TECHNICAL FIELD

This specification relates generally to internal combustion engines, and more particularly, to a cylinder head for use in internal combustion engines that includes an integrated cooling circuit to allow for coolant, such as super-critical carbon dioxide ($CO_2$), to be circulated at least partially therethrough to regulate exhaust temperatures, and an exhaust thermal control system implementing the same.

BACKGROUND INFORMATION

Spark ignited engines exhaust combustion gases during operation and output the same into exhaust systems that, for instance, control emissions and power turbochargers. In applications that utilize high-power density engines (e.g., in terms of kW/L), e.g., high performance sports cars, exhaust exiting from combustion cylinders can reach and exceed 1100 degrees Celsius (° C.).

Given the use of down-stream exhaust devices such as catalytic converters and turbochargers, an on-going need exists to control exhaust gas temperature to allow for their construction to not necessarily require the use of relatively high-temperature materials, and to allow for relatively more efficient operation of such devices.

SUMMARY

A cylinder head for use in an internal combustion engine, the cylinder head comprising a combustion section defining one or a plurality of combustion chambers which output heated combustion gases. An exhaust manifold is coupled to the combustion section, the exhaust manifold defining one or a plurality of exhaust inlets in fluid communication with said one or a plurality of combustion chambers to receive said heated combustion gases and one or a plurality of exhaust outlets each in fluid communication with said one or plurality of exhaust inlets. The exhaust manifold includes at least one coolant passageway to allow coolant to pass at least partially through the exhaust manifold and draw heat from said heated combustion gases received therein.

An exhaust manifold for fluidly coupling to one or a plurality of combustion chambers of an internal combustion engine, the exhaust manifold comprising one or a plurality of exhaust inlets to receive heated combustion gases from said one or plurality of combustion chambers. One or a plurality of exhaust outlets are in fluid communication with said one or plurality of exhaust inlets. One or a plurality of exhaust passageways are fluidly coupled to said one or plurality of exhaust inlets and said one or plurality of exhaust outlets. One or a plurality of coolant passageways are fluidly coupled to said one or plurality of exhaust inlets to receive and pass coolant at least partially through said exhaust manifold and draw heat from said heated combustion gases received therein.

A system for temperature control of exhaust gases in an internal combustion engine, the system comprising a combustion section defining one or a plurality of combustion chambers which output heated combustion gases and a coolant reservoir containing coolant and a pump for said coolant. An exhaust manifold is coupled to the combustion section, the exhaust manifold defining one or a plurality of exhaust inlets in fluid communication with said one or a plurality of combustion chambers to receive said heated combustion gases and one or a plurality of exhaust outlets each in fluid communication with said one or plurality of exhaust inlets. The exhaust manifold includes at least one coolant passageway disposed in the exhaust manifold and said pump is configured to circulate coolant at least partially through said exhaust manifold and draw heat from said heated combustion gases received therein. The system includes an engine control unit to receive a first temperature measurement from a temperature sensor disposed at said one or plurality of exhaust outlets of said exhaust manifold, the first temperature measurement representative of combustion gas temperature, and in response to the received temperature measurement exceeding a predetermined threshold, sending a signal to said pump to cause a volume of the coolant to pass through the at least one exhaust manifold coolant passageway.

BRIEF DESCRIPTION OF THE DRAWINGS

Various aspects and features of the present disclosure will be better understood by reading the following detailed description, taken together with the drawings wherein.

The drawings included herewith are for illustrating various examples of articles, methods, and apparatuses of the teaching of the present specification and are not intended to limit the scope of what is taught in any way.

DETAILED DESCRIPTION

Many down-stream exhaust devices such as super chargers have maximum inlet temperatures rated below that of temperatures of the exhaust gases output by combustion chambers of an engine, and particularly below exhaust temperatures resulting from an engine under load. For instance, some commercially available super chargers have maximum inlet temperatures of 950° C. Significant challenges arise when attempting to utilize such down-stream exhaust devices in scenarios where exhaust temperatures exceed upwards of 1100° C., for example. Engine designers account for such limitations through one or more mitigation strategies. For example, down-stream exhaust devices having inlets formed from high-temperature materials may be utilized, but such high-temperature devices are generally cost-prohibitive and increasing maximum inlet temperatures alone does not remedy temperature limitations of other components such as catalytic material that can melt when exposed to high exhaust temperatures.

Some other mitigation approaches seek to avoid these challenges by regulating exhaust temperatures during combustion cycles such that exhaust gases get output at a temperature under inlet maximums. One such approach includes protecting the aforementioned down-stream exhaust components by running the engine "rich" with excess fuel, with the excess fuel providing additional cooling through increased thermal mass in the combustion chamber and also through the chemical effect of rich combustion generating cooler combustion products.

However, this fuel-rich cooling scheme results in both emissions and fuel consumption penalties. Current United States (US) regulations allow for rich operation for component protection if duly and properly disclosed to the Environmental Protection Agency (EPA). Other jurisdictions require stricter controls, such as Europe, which has led many manufacturers of engines and engine systems to internally stipulate that all new engine designs include full-time stoichiometric operation. Such operation includes designing engines to operate using stoichiometric mixtures, which in the context of a gasoline engine, is a precise ratio of air to fuel that burns substantially all fuel with no excess air. Unfortunately, this results in the inability of engine designers to use approaches such as "rich" fuel burning to protect turbochargers and other down-stream exhaust devices when under high load operation.

Figure 1:
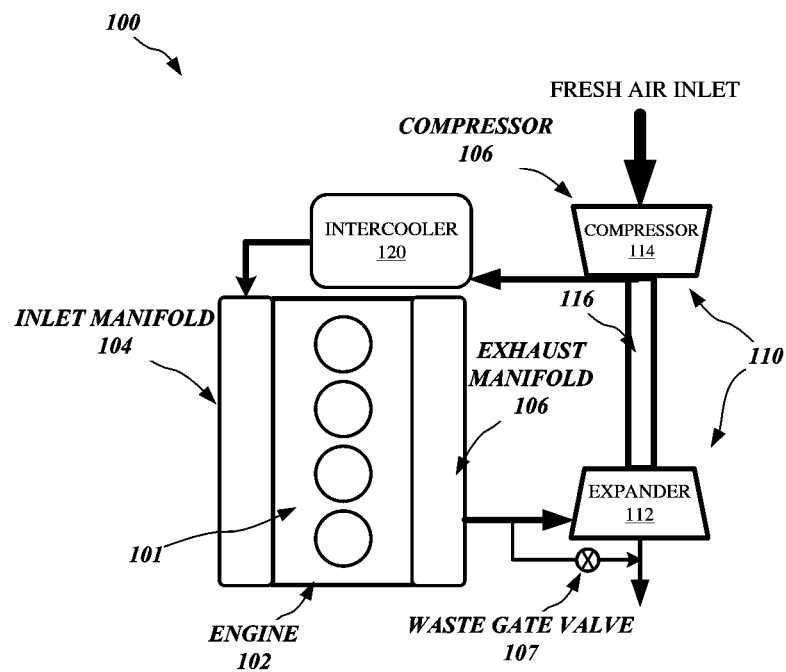
FIG. 1 shows an example internal combustion engine coupled to a super charger arrangement.

In addition, existing internal combustion engines generally include superchargers with waste gate valves. For example, as shown in FIG. 1, the engine system 100 includes an engine 102 coupled to a supercharger arrangement 110. The engine 102 includes a plurality of combustion chambers 101, an inlet manifold 104 disposed adjacent a first side of the combustion chambers 101 and an exhaust manifold 106 disposed adjacent a second side of the combustion chambers 101. The supercharger arrangement 110 includes an expander 112, a compressor 114, and a shaft 116 extending between the expander 112 and the compressor 114.

The expander 112 includes an inlet fluidly coupled to an outlet of the exhaust manifold 106 to receive exhaust gases and drive shaft 116. The compressor 114 includes an outlet coupled to intercooler 120 (e.g., a radiator) to provide air into inlet manifold 104 generated by rotation of shaft 116. As further shown, expander 112 and exhaust manifold 106 include a bypass line or return coupled via waste gate valve 107. Waste gate valve 107 opens to allow for exhaust gases to bypass the expander 112 when, for instance, there is more exhaust energy than the compressor needs at a given moment to provide boost to the engine 102. Waste gates, such as waste gate 107, include mechanical linkages and actuators that are prone to failure and remain a significant source of engine and turbocharger reliability issues.

High-temperature exhaust output raises numerous non-trivial challenges in the context of engine designs that seek to meet ever-increasing fuel efficiency and emission standards.

Thus, in accordance with an embodiment, a cylinder head is disclosed herein to allow for temperature control of exhaust gases exiting from an associated exhaust manifold. The cylinder head includes a combustion section that defines a plurality of combustion chambers and an exhaust manifold coupled to the combustion section. The combustion section includes a plurality of exhaust outlet ports and/or exhaust passageways that fluidly couple to exhaust inlets defined by the exhaust manifold.

The exhaust manifold includes at least one exhaust passageway in fluid communication with the exhaust inlets and in fluid communication with an exhaust outlet to receive combustion gases from the combustion section and output the same via the exhaust outlet. The combustion gases may also be referred to herein as heated combustion gases. The exhaust manifold further includes an integrated cooling circuit defined by at least one coolant passageway that at least partially surrounds the exhaust passageway with a coolant to draw heat from exhaust gases. The integrated cooling circuit includes a coolant inlet at a first end to receive coolant, e.g., super-critical $CO_2$, and a coolant outlet at a second end. The integrated cooling circuit thus allows for coolant to enter the cooling circuit, e.g., via displacement by a pump, and draw heat from exhaust gases passing through the exhaust manifold. The coolant then preferably passes out of the exhaust manifold via the coolant outlet to reject the heat drawn from the exhaust gases, and by extension, maintain exhaust temperatures exiting the exhaust manifold at or below a target temperature limit.

Note, the term split or split-zone in the context of a cylinder head consistent with the present disclosure does not necessarily refer to a cylinder head formed/cast from multiple pieces; rather, the term split as generally used herein refers to a cylinder head having at least two distinct zones/sections that allow for separate and distinct operating pressures and independent temperature control of the engine sections, e.g., via an integrated cooling of an exhaust manifold and/or an optional integrated cooling circuit provided by an intake manifold of the engine.

As generally referred to herein, supercritical in the context of a fluid refers to a state where the fluid is held at or above its associated critical temperature and critical pressure. For example, super critical $CO_2$ behaves as a supercritical fluid above a critical temperature of 304.13K (31 degrees Celsius/87.8 degrees Fahrenheit) and a critical pressure of 73.8 bar (7.3773 MPa, 72.8 atm, 1070 pound per square inch (psi)).

Preferably, and in accordance with an embodiment, the cylinder head includes an exhaust manifold formed as a high-pressure casing to allow for supercritical $CO_2$ to be utilized as a coolant within the integrated cooling circuit. The term high-pressure refers to a casing/section capable of operating with internal pressures of 2000 psi or higher, e.g., in the range of 2000 psi to 5000 psi. The split-zone cylinder head can further include an inlet manifold formed with a relatively low-pressure casing to provide engine coolant, e.g., air, water, and so on, for cooling of combustion chambers. The low-pressure casing of the inlet manifold can be configured to preferably operate with internal pressures of −2 bar (~−29 psi), for instance, although other pressure ratings are within the scope of this disclosure.

In an embodiment, an engine exhaust temperature control system, also referred to herein as an engine system, implements a split-zone cylinder head consistent with the present disclosure. The engine system includes an engine control unit (ECU) electrically coupled to a temperature sensor at an exhaust outlet of an exhaust manifold and/or at another down-stream location such as the inlet of a supercharger. The ECU electrically couples to a pump and provides a signal to the same in order to selectively displace a volume of coolant into the exhaust manifold, e.g., via an integrated cooling circuit. The ECU periodically monitors exhaust temperatures via the temperature sensor, e.g., every 1 second and preferably every 25-100 milliseconds, and selectively drives the pump to displace coolant into the integrated cooling circuit of the exhaust manifold to achieve and maintain a target exhaust temperature within, for instance, ±100° C., and preferably, ±25° C.

Thus, aspects and embodiments of the present disclosure provide numerous benefits and advantageous over existing internal combustion engine designs. For example, the ECU and temperature sensor arrangement provides a feedback loop to allow for temperature control of exhaust gases via an integrated cooling circuit within the exhaust manifold. Preferably, the integrated cooling circuit of the exhaust manifold is configured as a casing/housing that allows for high-pressure, super-critical $CO_2$ to circulate/pass therethrough. An engine configured consistent with the present disclosure may therefore regulate and control exhaust temperatures while an engine is under load, and in scenarios where providing reduced exhaust energy into turbocharger systems is desired to maximize fuel efficiency. This preferably further avoids the necessity of fuel-rich operation, and the necessity of waste gates in turbocharger arrangements as discussed above. Thus, aspects and embodiments of the present disclosure preferably allow for engine designers and vehicle manufacturers to achieve greater fuel efficiency, increased engine reliability, and the ability to meet current and future emissions and carbon output regulations.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the target/nominal characteristic. To provide one non-limiting numerical example to quantify "substantially," such a modifier is intended to include minor variation that can cause a deviation of up to and including ±10% from a particular stated quality/characteristic unless otherwise provided by the present disclosure.

Figure 2:
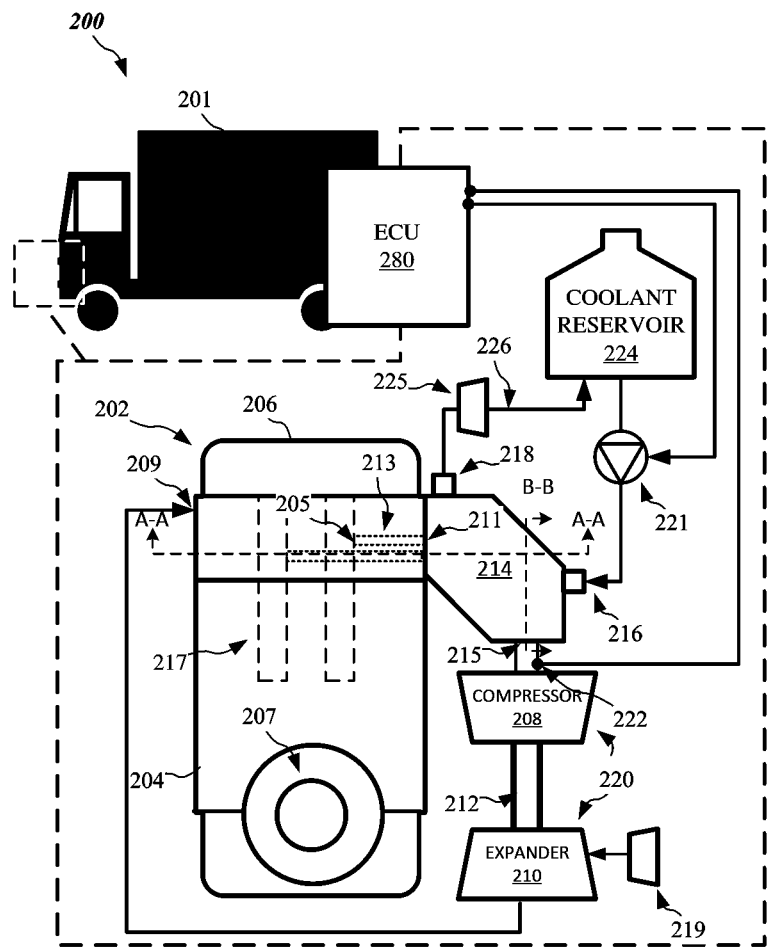
FIG. 2 shows an example engine system consistent with embodiments of the present disclosure.

Turning to the figures, FIG. 2 shows an example engine system 200 in accordance with embodiments of the present disclosure. The embodiment of FIG. 2 includes the engine system 200 implemented within vehicle 201. Note, aspects and embodiments of the present disclosure are not limited in this regard and may be utilized in a wide-range of applications that feature internal combustion engines including, for instance, boats, automobiles, airplanes, and industrial machinery.

Continuing on, the engine system 200 includes an engine (or motor) 202 for powering an associated drive train (not shown). The engine 202 includes an engine block 204 and a cylinder head casting 206 coupled/mounted to the engine block 204. The cylinder head casting 206 may be formed via molten casting, or through other approaches such as milling. Accordingly, the term casting is not intended to limit the present disclosure to cylinder heads formed via casting.

Figure 3:
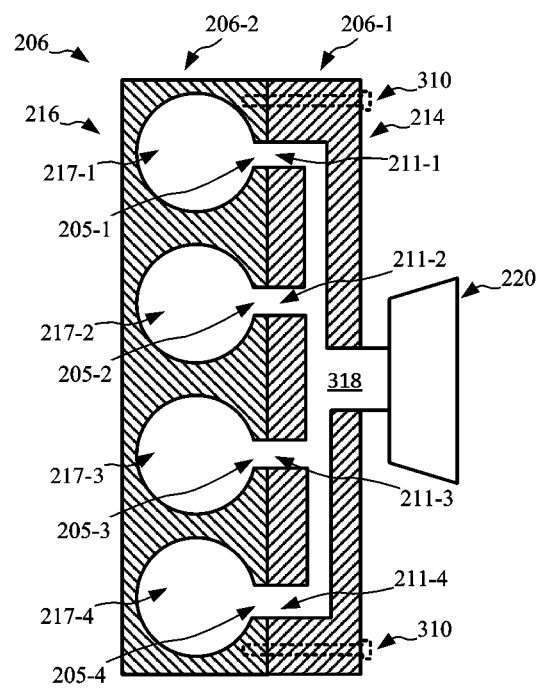
FIG. 3 shows a cross-sectional view of a cylinder head suitable for use in the example engine system of FIG. 2, in accordance with an embodiment.

The example of the engine block 204 defines a lower portion/section of each of the combustion chambers 217. Each combustion chamber includes an associated piston disposed therein (not shown), with each piston being coupled to crankshaft 207 by way of an internal connecting rod (not shown). The crankshaft 207 couples to, for instance, a power train of the vehicle 201. Preferably, each of the combustion chambers 217 fluidly couples with internal ducts/passageways 213. However, it is contemplated that the combustion chamber outlet 205 may be directly coupled to the exhaust inlet 211 (FIG. 2) or individual exhaust inlets 211-1, 211-2, 211-3 and 211-4 (FIG. 3). This would obviate the need for passageway 213 in the cylinder head. Note, the cylinder head casting 206 and exhaust manifold 214 may be formed from a single, monolithic piece of material.

The cylinder head casting 206, also referred to herein as a cylinder head, defines an upper portion of a plurality of the combustion chambers 217. The cylinder head casting 206 includes an intake side (or intake manifold section) generally shown at inlet 209 to receive fuel, oxygen, and other working fluids such as water for cooling purposes. The cylinder head casting 206 further includes an exhaust side with exhaust manifold 214 disposed opposite the intake side. The exhaust manifold 214 fluidly couples with combustion chambers 217 to receive combustion gases, also referred to herein as exhaust gas. This may preferably be achieved via internal ducts/passageways 213 formed within the cylinder head casting 206. As discussed in greater detail below, the exhaust manifold 214 can include an integrated cooling circuit to provide temperature control of exhaust gases exiting exhaust manifold 214. Reference to an integrated cooling circuit should be understood as one or a plurality of pathways within the exhaust manifold where coolant may be introduced and removed and wherein the coolant may also preferably be recirculated including recirculation through a heat exchanger 225 and/or coolant reservoir 224. However, coolant may also be passed through the plurality of pathways without necessarily being recirculated via coolant reservoir 224 and return line 226.

Figure 4:
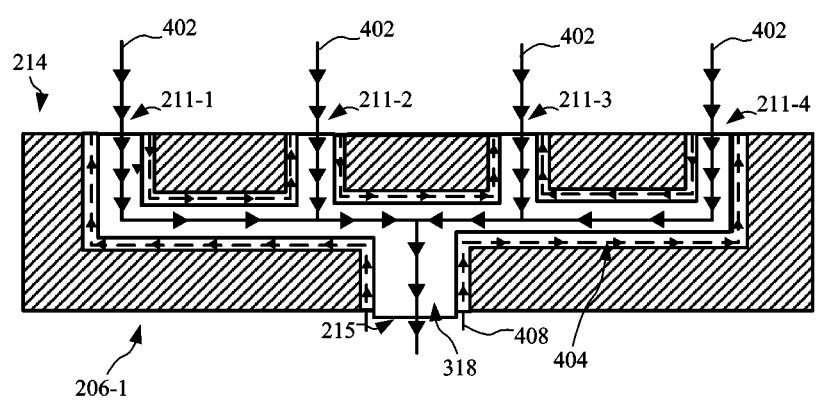
FIG. 4 shows another cross-sectional view of a cylinder head suitable for use in the example engine system of FIG. 2 in accordance with an embodiment.

The exhaust manifold 214 preferably includes a plurality of exhaust inlets shown collectively at 211, and individually as exhaust inlets 211-1 to 211-4 in FIG. 4. The exhaust inlets 211 are configured to fluidly couple with exhaust outlets 205 and receive combustion gases therefrom. Preferably this fluid coupling can be achieved by coupling with passageways 213 in the cylinder head. The exhaust inlets 211 may also be referred to herein as exhaust ports, or simply ports. As alluded to above, the cylinder head casting 206 may be optionally implemented without passageways 213. For example, and as shown in FIG. 3, the cylinder head casting 206 can fluidly couple combustion chambers 217-1 to 217-4 to the exhaust inlets 211 of the exhaust manifold 214 via exhaust outlets 205 directly, e.g., without the use of passageways 213.

Continuing with FIG. 2, the exhaust manifold 214 preferably includes an exhaust outlet 215 coupled to a turbocharger arrangement 220. The turbo charger arrangement 220 includes an engine component such as a compressor 208, an expander 210, and a shaft 212 coupled between the compressor 208 and the expander 210. Combustion gas exiting exhaust manifold 214 by way of exhaust outlet 215 enters compressor 208 and causes a turbine (not shown) to spin/rotate, and thus by extension, the shaft 212 to also spin/rotate. The movement of the shaft 212 then drives a turbine within expander 210. The turbine within the expander 210 then draws fresh air into the inlet 209 by way of air intake 219.

The exhaust manifold includes at least one coolant inlet 216 preferably disposed adjacent the exhaust outlet 215, and at least one coolant outlet 218 (or coolant return 218) preferably disposed adjacent the exhaust inlets 211. Accordingly, the coolant inlet 216 and coolant outlet 218 are disposed preferably at opposite ends of the exhaust manifold 214, and more specifically, at opposite ends of the integrated cooling circuit within the exhaust manifold 214. The coolant inlet 216 fluidly couples to a coolant reservoir 224 by way of pump 221. Likewise, coolant outlet 218 fluidly couples to the coolant reservoir 224 by way of return line 226. In an embodiment, the coolant reservoir 224 defines a cavity to hold carbon dioxide, and preferably, super critical $CO_2$.

The coolant reservoir 224 is therefore preferably configured with a pressure housing to store and maintain carbon dioxide in the aforementioned supercritical state, e.g. at or above 1070 psi. The coolant reservoir 224 can be coupled to a thermal management system (not shown) having one or more active cooling components, e.g., a compressor, to maintain a target temperature to maintain the critical state (e.g., at least 304.13K).

An engine control unit 280 electrically couples to pump 221 and is configured to provide a driving signal to cause pump 221 to draw coolant, e.g., super critical $CO_2$, from the coolant reservoir 224 into exhaust manifold 214 by way of coolant inlet 216. The engine control unit 280 is also optionally electrically coupled to a temperature sensor 222 disposed adjacent outlet 215. The temperature sensor 222 comprises any suitable sensor capable of measuring exhaust temperatures present at the outlet 215 and outputting a proportional electrical signal. Such temperature sensor may then identify the temperature of the exhaust gases introduced to a downstream engine component, such as compressor 208.

In an embodiment, the engine control unit 280 includes a cold-start mode (also referred to as an engine start mode) whereby the engine 202 begins to combust fuel, or "turn over," and start from an ambient temperature. In this embodiment, the engine 202 is at a temperature substantially equal to that of the ambient temperature of the surrounding environment. Residual coolant, e.g., $CO_2$, within exhaust manifold 214, and more particularly, within the integrated cooling circuit of the exhaust manifold 214, also has a temperature substantially equal to that of the engine 202 and ambient temperature. This residual coolant provides a thermal conduction path to transfer heat generated by the engine 202 to the catalyst in the catalytic converter, e.g., to comply with emission requirements. This advantageously accelerates the rate at which the engine 202 heats exhaust products from an ambient temperature to a target operating temperature, thereby reducing the latency between cold start and catalytic function.

The cold-start mode preferably includes the engine control unit 280 periodically measuring exhaust temperatures via the temperature sensor 222, e.g., every 1-2 seconds and preferably every 5 to 250 milliseconds. The engine control unit 280 then outputs a driving signal to pump 221 in response to the measured exhaust temperatures being equal to, or exceeding, a predetermined threshold temperature (or target temperature) to transition the engine control unit 280 into an exhaust temperature control mode. One such example predetermined threshold temperature is between 400 to 500 degrees Celsius.

In the exhaust temperature control mode, the engine control unit 280 provides a driving signal to pump 221 to maintain temperature at a target temperature of preferably ±100° C., and more preferably ±25° C. The pump 221 receives the driving signal, and in response thereto, generates a pressure differential that forces a volume of coolant from the coolant reservoir 224 into the integrated cooling circuit within the exhaust manifold 214. Note, the initial volume of coolant displaces the aforementioned residual coolant to flush the same and optionally recapture at least a portion of the residual coolant in the coolant reservoir 224.

Thus, the engine control unit 280, exhaust manifold 214, and temperature sensor 222 form a feedback loop that allows for control of exhaust temperatures.

The volume of coolant then passes through the exhaust manifold 214 to draw heat from combustion gases. The coolant then exits the exhaust manifold 214 via coolant outlet 218. From there, the coolant then passes through heat exchanger 225 (e.g., a radiator) and then back to the coolant reservoir 224 via return line 226.

In an embodiment, the engine system 200 preferably allows for elimination of mechanical waste gates through the use of an exhaust manifold 214 including an integrated cooling circuit consistent with the present disclosure. As previously discussed, waste gates on turbochargers include linkages and actuators to mechanically open and bypass exhaust flow around an associated turbine at moments where the available exhaust energy exceeds the amount needed by the turbocharger to maintain a target engine boost.

The example engine system 200 allows for increasing the flow of coolant into the integrated cooling circuit of the exhaust manifold 214 to achieve a target exhaust temperature at the input/inlet of a turbocharger. Such target exhaust gas temperature is preferably in the range of 600-950 degrees Celsius. Such target exhaust temperatures then preferably reduces the enthalpy flow to the turbine of the turbocharger and allows for active turbine torque control without the necessity of an actuator and linkage for mechanical waste gate control. As previously discussed, such actuators and linkages are a common source of mechanical failure and may contribute to reliability issues within existing turbocharger systems.

Turning to FIG. 3, an example cross-sectional view of a jacketed exhaust passageway within the exhaust manifold 214 is shown taken along line A-A of FIG. 2. As shown, the cylinder head 206 includes a first section/zone 206-1 defining the exhaust manifold 214, and a second section/zone 206-2 defining combustion chambers shown collectively as 217 in FIG. 1 and individually as 217-1 to 217-4 in FIG. 3. The second section 206-2 may also be referred to as a combustion section.

The first section 206-1 includes at least one exhaust passageway 318 and an integrated cooling circuit that at least partially surrounds the exhaust passageway to provide a jacketed exhaust passageway, as discussed in greater detail below. The second section 206-2 can optionally include a cooling circuit (not shown), e.g., a water cooling system, to reject heat generated by operation of the cylinders.

The first section 206-1 of the cylinder head which amounts to the exhaust manifold 214 can preferably be formed of a first material capable of withstanding pressures of at least 2000 psi and preferably pressures between 2000-5000 psi, to allow for the displacement coolant, e.g., supercritical $CO_2$, through the integrated cooling circuit disposed therein. More preferably, the material for the exhaust manifold is capable of withstanding pressures in the range of 2000 psi to 5000 psi, or 3000 psi to 5000 psi, or 3500 psi to 5000 psi. One particularly preferred embodiment comprises material for the exhaust manifold that will withstand pressure of 3500 psi to 4500 psi. In an embodiment, the first material comprises a metal or metal alloy, and preferably iron (Fe) or an alloy thereof, although other metal and metal alloys such as aluminum (Al) can be utilized.

The second section 206-2 of the cylinder head casting 206 can be formed from a second material capable of operating at pressures normally associated with combustion engines, e.g., cylinder pressures between 300 and 1500 PSI. For example, the second material comprises a metal or metal alloy formed from Al or Fe. In addition, the second section 206-2 can define an inlet manifold with a water/air cooling circuit capable of operating at pressures less than that of the exhaust manifold, and preferably −2 bar (~−29 psi).

Preferably, the first and section sections 206-1, 206-2 may be integrally formed from a single, monolithic piece of material, taking into consideration maximum pressure requirements. However, the first and section sections 206-1, 206-2 may be formed from multiple pieces and coupled together during manufacturing. For instance, the first and section sections 206-1, 206-2 may be formed separately from the same or different materials and then coupled together to fluidly couple exhaust inlets 211-1 to 211-4 of the first section 206-1 with corresponding outlets of the second section 206-2. Bolts 310 or other suitable attachment device can be optionally used to securely couple the first and second sections 206-1, 206-2 together.

In any such cases, the cylinder head 206 may therefore be referred to as a split-zone or split-casting based on the first and second sections 206-1, 206-2. Note, the term split in the context of a cylinder head casting consistent with the present disclosure does not necessarily refer to a cylinder head casting 206 being formed/cast from multiple pieces; rather, the term split as generally used herein refers to the cylinder head casting 206 having at least two distinct temperature and pressure zones that allow independent temperature control of the first and second sections 206-1, 206-2, and more specifically, independent temperature control of the of the exhaust manifold region provided by the first section 206-1 and the combustion chamber region provided by the second section 206-2.

FIG. 4 shows another cross-sectional view of the cylinder head casting 206 taken along line A-A of FIG. 2, and more particularly, a cross-sectional view of first section 206-1 that forms the exhaust manifold 214 in isolation. As shown, the exhaust manifold 214 defines exhaust passageway 318. The exhaust passageway 318 includes a first end fluidly coupled to exhaust inlets 211-1 to 211-4 and a second end fluidly coupled to exhaust outlet 215. FIG. 4 shows only one exhaust outlet 215. However, it is contemplated that one may have a plurality of exhaust outlets.

An integrated cooling circuit provided by coolant passageway 404 is thermally coupled to the region defining the exhaust passageway 318 to draw heat from exhaust gases 402 passing through the exhaust manifold 214. In an embodiment, the coolant passageway 404 is preferably defined by at least one sidewall that forms the exhaust passageway 318. Accordingly, coolant such as $CO_2$ passing through the coolant passageway 404 passes over, and draws heat from the exhaust passageway 318 via thermal communication.

Figure 5:
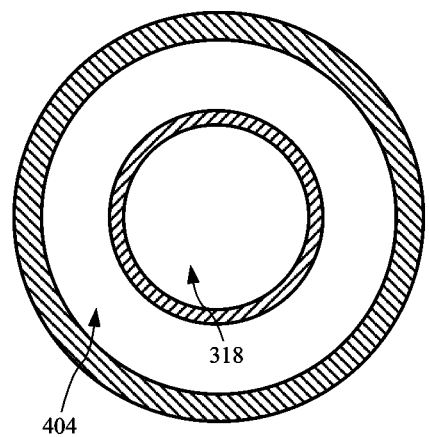
FIG. 5 shows a cross-sectional view of a jacketed exhaust passageway in accordance with an embodiment.

As shown and described in detail below with regard to FIGS. 5-8, the coolant passageway 404 preferably follows, and extends substantially parallel with, the exhaust passageway 318 from end-to-end, e.g., from the exhaust inlets 211-1 to 211-4 to the exhaust outlet 215, to provide an end-to-end coolant jacket such as shown in the cross-sectional view of FIG. 5 which is taken along line B-B of FIG. 2. This arrangement may also be referred to herein as a jacketed exhaust passageway.

The coolant passageway 404 can include sections that fully surround the outer diameter/perimeter of the exhaust passageway 318 to allow for the coolant passing therethrough to draw heat from up to 360 degrees around the exhaust passageway 318.

Figure 6:
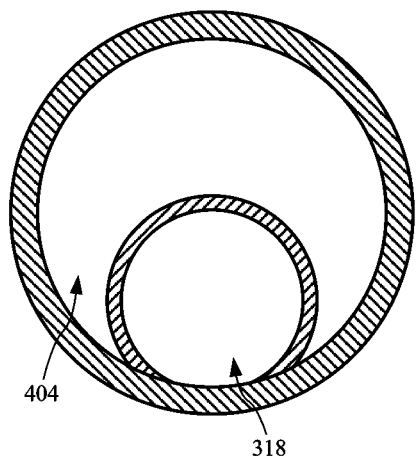
FIG. 6 shows another cross-sectional view of a jacketed exhaust passageway in accordance with an embodiment.

Alternatively, or in addition, sections of the coolant passageway 404 can include other configurations including partially surrounding the exhaust passageway 318, such as shown in the cross-sectional view of FIG. 6. Likewise, while the exhaust passageway 318 and coolant passageway 404 are illustrated as having substantially cylindrical profiles (with substantially circular cross-sections) that extend substantially concentric with each other, see e.g., FIGS. 5, and 7-8, other shapes and configurations are within the scope of this disclosure. For instance, the coolant passageway 404 and exhaust passageway 318 can include other regular and irregular shapes and profiles such as rectangular, hexagonal, and oval.

Continuing with FIG. 4, the exhaust passageway 318 is configured to receive exhaust gases 402 via exhaust inlets 211-1 to 211-4 and output the same via exhaust outlet 215. The coolant passageway 404 is configured to receive coolant 408 via coolant inlet 216 (FIG. 2) and pass the same towards exhaust inlets 211, e.g., based on displacement caused by pump 221 (FIG. 2), and ultimately to coolant outlet 218. The coolant passageway 404 can include a plurality of interconnected passageways (or branches) that receive coolant 408 via the coolant inlet 216 and communicate the same through the exhaust manifold 214 via coolant passageway 404. In addition, the coolant passageway 404 can include a collector (not shown) adjacent the coolant outlet 218 to allow for various branches of the coolant passageway 404 to converge and output coolant via a single coolant outlet 218. Note, the exhaust manifold 214 can include two or more coolant outlets, and this disclosure is not limited in this regard.

The coolant passageway 404 of the integrated cooling circuit can be preferably configured to displace coolant in a direction that is substantially opposite to that of the direction of exhaust flow through the exhaust passageway, such as shown FIG. 4. This advantageously provides increased heat transfer performance relative to having the coolant displaced in a direction that is substantially the same to that of the exhaust flow based on the temperature difference between the exhaust flow and the coolant being largest at the coolant entry point into the exhaust manifold. However, other embodiments are within the scope of this disclosure including having the coolant displaced in a direction that is substantially the same as the direction of the exhaust flow through the exhaust passageway.

Figure 7:
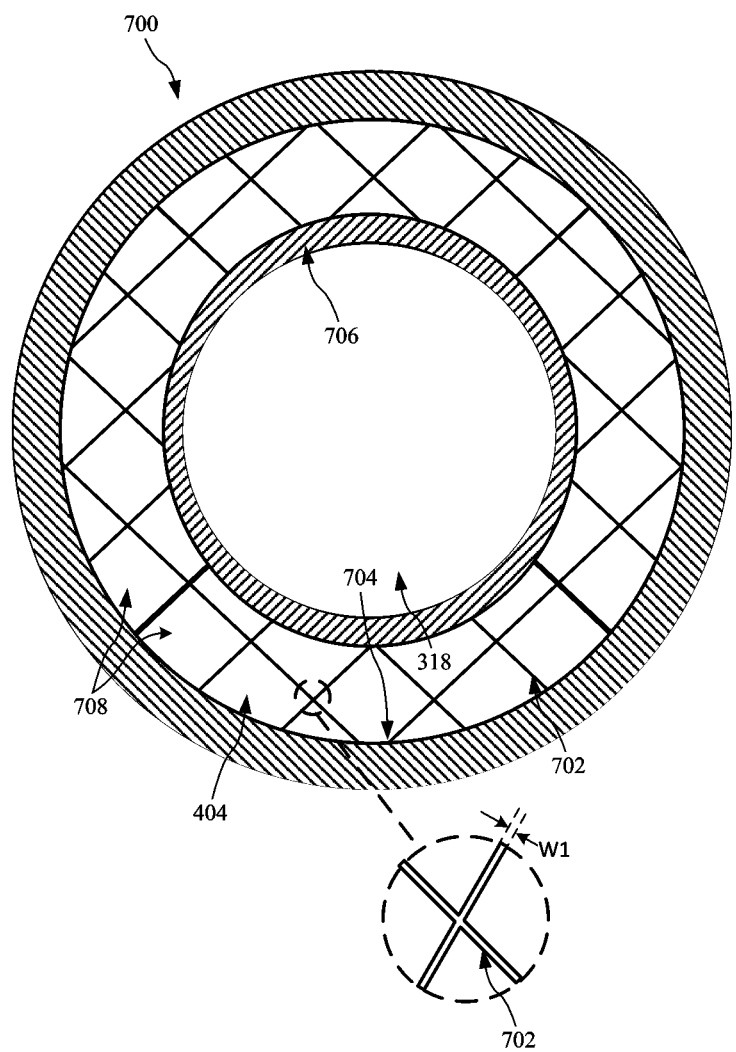
FIG. 7 shows a cross-sectional view of a jacketed exhaust passageway having a plurality of networked struts in accordance with an embodiment.

FIG. 7 illustrates a cross-sectional view of a jacketed exhaust passageway 700 taken along line B-B of FIG. 2. FIG. 7 shows the coolant passageway 404 surrounding the exhaust passageway 318 in a substantially similar configuration to that of the embodiment shown in FIG. 6. However, the jacketed exhaust passageway 700 preferably includes a plurality of struts 702 that form a web-like, interconnected network of heatsinks (or heatsink structures). The struts 702 may be cast via molten metal poured into a mold, or formed via other suitable approaches. The struts 702 are preferably formed integrally with the sidewalls 704, 706 as a single, monolithic piece.

Each strut of the plurality of struts 702 preferably extend substantially parallel with the exhaust passageway 318 and coolant passageway 404. In addition, the struts 702 adjoin the sidewall 704 defining the inner diameter of the coolant passageway 404 with the outer diameter of the sidewall 706 that defines the exhaust passageway 318. The struts 702 preferably crisscross/intersect with each other along the length of the coolant passageway 404 and provide a plurality of channels 708 that extend substantially parallel with each other and with the longitudinal axis of the exhaust passageway 318.

The struts 702 can provide blade-like structures based on having a relatively thin overall width W1, e.g., 0.5-3 mm, to split/divide a volume of incident coolant flowing through the coolant passageway 404 and preferably pass the divided volume into the plurality of parallel channels 708 defined by struts 702. The overall length of struts 702 can be substantially equal to the length of the exhaust passageway 318, although the particular length of the struts 702 can vary depending on a desired configuration.

The struts 702 thermally couple with the exhaust passageway 318 and provide a plurality of thermal communication paths which extend from the sidewall 706 that defines the exhaust passageway 318, and more particularly, which extend substantially transverse relative to the longitudinal axis of the exhaust passageway 318. The internal surfaces defining the channels 708 of the struts 702 substantially increases the overall amount of surface area provided within the coolant passageway 404, and thus by extension, increase thermal communication and heat dissipation. In addition, the struts 702 provide structural reinforcement along the longitudinal axis of the exhaust passageway 318 while permitting coolant to flow through relatively continuously and unobstructed through coolant passageway 404.

Figure 8:
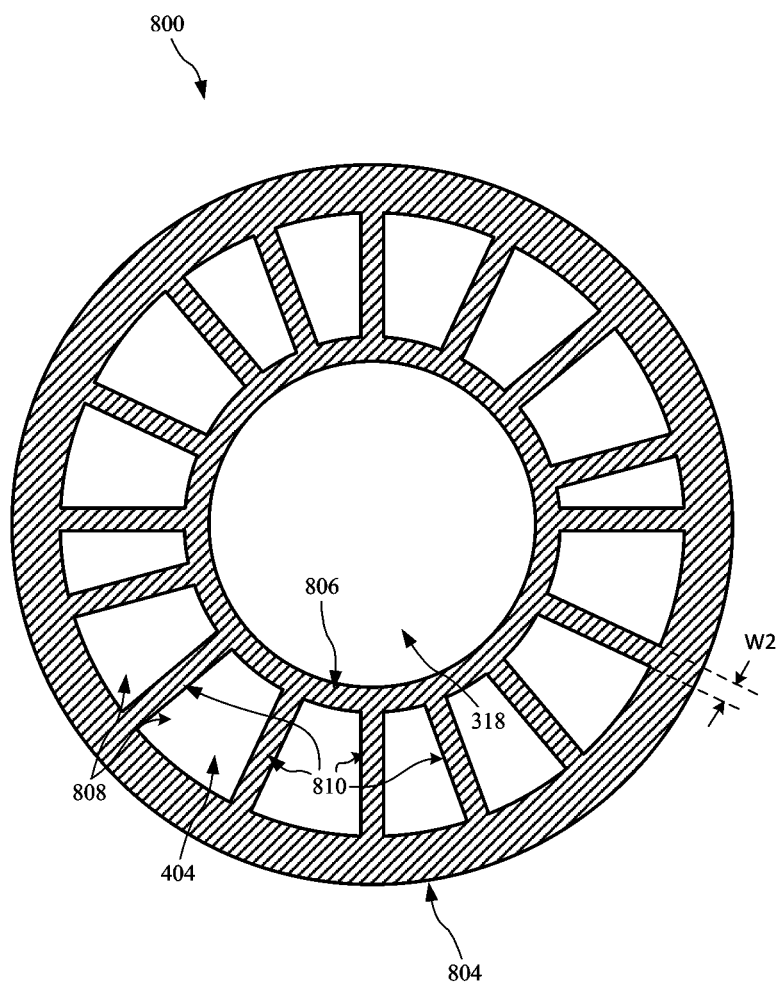
FIG. 8 shows a cross-sectional view of a jacketed exhaust passageway having a plurality of fin members, in accordance with an embodiment.

FIG. 8 illustrates a cross-sectional view of another preferred jacketed exhaust passageway 800 taken along line B-B of FIG. 2. FIG. 8 shows the coolant passageway 404 surrounding the exhaust passageway 318 in a substantially similar configuration to that of the embodiment shown in FIGS. 5 and 7. However, FIG. 8 includes a plurality of fin members 810 that extend substantially parallel with the longitudinal axis of the exhaust passageway 318. Each fin of the plurality of fin members 810 extend between and adjoin the sidewall 806 defining the exhaust passageway 318 and the sidewall 804 defining the coolant passageway 404. Similar to the struts 702 of FIG. 7 discussed above, this configuration allows for the fin members 810 to provide thermal communication paths that extend from the sidewall 806 defining the exhaust passageway 318 to the sidewall 804 defining the outer diameter/extent of coolant passageway 404. Likewise, the fin members 810 define a plurality of channels 808 to allow for a volume of coolant passing through the coolant passageway 404 to be divided/split.

In an embodiment, each fin member of the plurality of fin members 810 can include an overall width W2 of 1-5 mm, and preferably 2-3 mm, although other widths are within the scope of this disclosure. The plurality of fin members 810 can include a substantially uniform width, or alternatively, the width of each fin member 810 can be non-uniform depending on a desired configuration. Each of the fin members 810 may also be uniformly spaced/disposed apart from each other, or alternatively, spaced apart at varying distances, such as shown in FIG. 8. In any such cases, the relatively wide overall width W2 of the fin members 810 allows the same to operate as heatsink structures with proportionally larger thermal communication paths relative to the struts 702 of FIG. 7. Likewise, the fin members 810 can provide increased structural support to reinforce the exhaust passageway 318.

Figure 9:
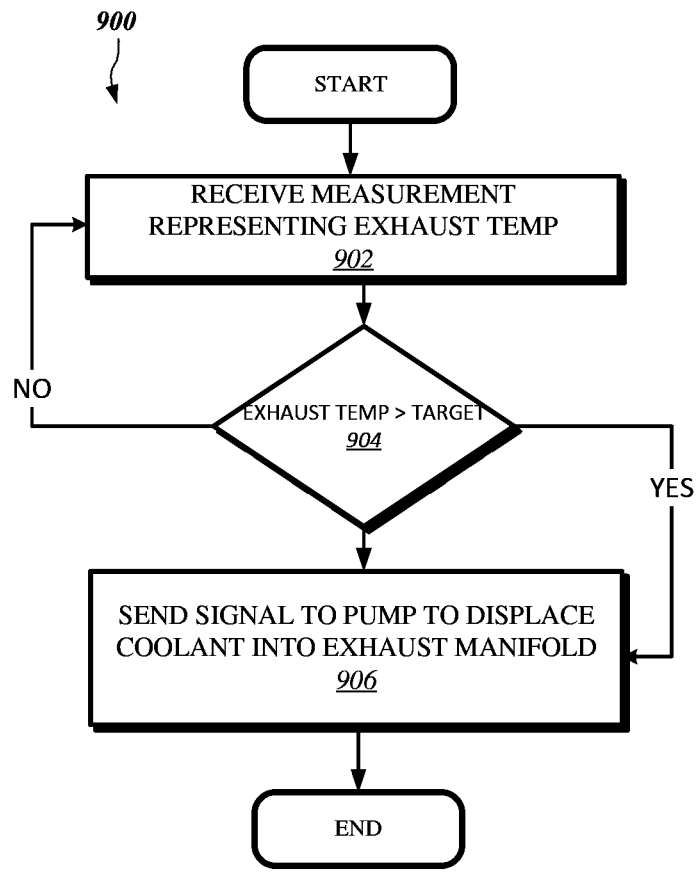
FIG. 9 shows an example method of controlling exhaust temperatures in accordance with an embodiment.

FIG. 9 shows an example method 900 of exhaust temperature control that exemplifies various aspects and features disclosed herein. The method 900 can be performed by engine control unit 280, although this disclosure should not be construed as limited in this regard. In act 902, the engine control unit 280 receives a measurement representing exhaust temperatures, e.g., from temperature sensor 222 (FIG. 2) disposed at the exhaust outlet of the exhaust manifold 214. In act 904, the engine control unit 280 determines whether the received measurement exceeds a target temperature (or threshold temperature). For example, in a cold-start mode the target temperature may equal 500° C. On the other hand, during normal operation (also referred to herein as an exhaust temperature control mode) the target temperature may equal up to 1000° C., or more, depending on a desired target. In any such cases, if the exhaust temperature does not exceed the target temperature, the method 900 optionally returns to act 902 after a predetermined delay/interval, e.g., 1 second. On the other hand, if the exhaust temperature exceeds the target temperature, the method 900 continues to act 906. In act 906, the engine control unit 280 sends a signal to a pump, e.g., pump 222, to cause the same to generate suction force and displace a volume of coolant, e.g., super critical $CO_2$, into exhaust manifold 214.

In accordance with an aspect of the present disclosure a cylinder head for use in an internal combustion engine is disclosed. The cylinder head comprising a combustion section defining one or a plurality of combustion chambers that output heated combustion gases, an exhaust manifold coupled to said combustion section, said exhaust manifold having one or a plurality of exhaust inlets in fluid communication with said one or plurality of combustion chambers to receive said heated combustion gases, and one or a plurality of exhaust outlets in fluid communication with said one or plurality of exhaust inlets, and wherein said exhaust manifold includes one or a plurality coolant passageways to allow coolant to pass at least partially through said exhaust manifold and draw heat from said heated combustion gases received therein.

In accordance with an aspect of the present disclosure an exhaust manifold for fluidly coupling to one or a plurality of combustion chambers of an internal combustion engine is disclosed. The exhaust manifold comprising one or a plurality of exhaust inlets to receive heated combustion gases from said one or plurality of combustion chambers, one or a plurality of exhaust outlets in fluid communication with said one or plurality of exhaust inlets, one or a plurality of exhaust passageways fluidly coupled to said one or plurality of exhaust inlets and said one or plurality of exhaust outlets, and one or a plurality of coolant passageways, said one or plurality of coolant passageways to fluidly couple to said one or plurality of exhaust inlets to receive and pass coolant at least partially through said exhaust manifold and draw heat from said heated combustion gases received therein.

In accordance with another aspect of the present disclosure a system for temperature control of exhaust gases in an internal combustion engine. The system comprising a combustion section defining one or a plurality of combustion chambers that output heated combustion gases, a coolant reservoir containing coolant and a pump for said coolant, an exhaust manifold coupled to said combustion section, said exhaust manifold having one or a plurality of exhaust inlets in fluid communication with said one or plurality of combustion chambers to receive said heated combustion gases, and one or a plurality of exhaust outlets in fluid communication with said one or plurality of said exhaust inlets, wherein said exhaust manifold includes one or a plurality of coolant passageways and said pump is configured to pass coolant at least partially through said exhaust manifold via said one or plurality of coolant passageways and draw heat from said heated combustion gases received via said one or plurality of exhaust inlets, and an engine control unit to receive a first temperature measurement from a temperature sensor disposed at said one or plurality of exhaust outlets of said exhaust manifold, said first temperature measurement representative of combustion gas temperature, and in response to said received temperature measurement exceeding a predetermined threshold, sending a signal to said pump to cause a volume of said coolant to pass through said one or plurality of coolant passageways.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that an apparatus may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed:

1. A cylinder head for use in an internal combustion engine, said cylinder head comprising:
   a combustion section defining one or a plurality of combustion chambers that output heated combustion gases;
   an exhaust manifold coupled to said combustion section, said exhaust manifold having one or a plurality of exhaust inlets in fluid communication with said one or plurality of combustion chambers to receive said heated combustion gases, and one or a plurality of exhaust outlets in fluid communication with said one or plurality of exhaust inlets;
   wherein said exhaust manifold includes one or a plurality coolant passageways to allow coolant to pass at least partially through said exhaust manifold and draw heat from said heated combustion gases received therein; and
   a turbocharger arrangement, said turbocharger arrangement having a compressor with an inlet to fluidly couple to said one or plurality of exhaust outlets of said exhaust manifold wherein one or plurality of exhaust outlets of said exhaust manifold fluidly couples to said inlet of said compressor of said turbocharger arrangement without a waste gate.

2. The cylinder head of claim 1, wherein said combustion section and said exhaust manifold are integrally formed from a single, monolithic piece of material.

3. The cylinder head of claim 1, wherein said combustion section comprises a first material and said exhaust manifold comprises a second material.

4. The cylinder head of claim 3, wherein said first material of said combustion section comprises Aluminum (Al), and said second material of said exhaust manifold comprises Iron (Fe).

5. The cylinder head of claim 1, wherein said exhaust manifold provides a first casing capable of internal operating pressures within said one or plurality of coolant passageways of 2000 to 5000 pound per square inch (psi).

6. The cylinder head of claim 5, wherein said exhaust manifold includes one or a plurality of coolant inlets fluidly coupled at a first end of said one or plurality of coolant passageways to receive said coolant, and one or a plurality of coolant outlets fluidly coupled at a second end of said one or plurality of coolant passageways.

7. The cylinder head of claim 6, wherein said one or plurality of coolant outlets is disposed adjacent said combustion section and said one or plurality of coolant inlets is disposed adjacent said one or plurality of exhaust outlets.

8. The cylinder head of claim 1, wherein said one or plurality of coolant passageways is configured to pass supercritical carbon dioxide ($CO_2$) in a first direction through said exhaust manifold.

9. The cylinder head of claim 8, wherein said first direction is substantially opposite of a direction of combustion gases entering said exhaust manifold via said one or plurality of exhaust inlets and exiting via said one or plurality of exhaust outlets.

10. The cylinder head of claim 1, further comprising one or a plurality of exhaust passageways defined by said exhaust manifold, said one or plurality of exhaust passageways fluidly coupling said one or plurality of exhaust inlets with said one or plurality of exhaust outlets, wherein said one or plurality of coolant passageways at least partially surrounds said one or plurality of exhaust passageways such that a volume of coolant passing through said one or plurality of coolant passageways draws heat from around an outer diameter of said one or plurality of exhaust passageways.

11. The cylinder head of claim 1, further comprising one or a plurality of exhaust passageways defined by said exhaust manifold, said one or plurality of exhaust passageways fluidly coupling said one or plurality of exhaust inlets with said one or plurality of exhaust outlets, wherein said one or plurality of coolant passageways includes a heatsink structure thermally coupled to said one or plurality of exhaust passageways and said one or plurality of coolant passageways, said heatsink structure to provide a plurality of channels that extend substantially parallel with said one or plurality of exhaust passageways to allow coolant to flow therethrough, and a plurality of thermal communication paths that extend substantially transverse relative to a longitudinal axis of said one or plurality of exhaust passageways.

12. The cylinder head of claim 11, wherein said heatsink structure comprises a plurality of fin members.

13. The cylinder head of claim 11, wherein said heatsink structure comprises a network of interconnected struts, each strut of said network of interconnected struts defining a blade-like structure to divide and pass a volume of coolant into said plurality of channels along said one or plurality of coolant passageways.

14. The cylinder head of claim 1 further including a coolant reservoir containing super critical $CO_2$ that is in fluid communication with said one or plurality of coolant passageways in said exhaust manifold.

15. An exhaust manifold for fluidly coupling to one or a plurality of combustion chambers of an internal combustion engine, the exhaust manifold comprising:
   one or a plurality of exhaust inlets to receive heated combustion gases from said one or plurality of combustion chambers;
   one or a plurality of exhaust outlets in fluid communication with said one or plurality of exhaust inlets;
   one or a plurality of exhaust passageways fluidly coupled to said one or plurality of exhaust inlets and said one or plurality of exhaust outlets;
   one or a plurality of coolant passageways, said one or plurality of coolant passageways to fluidly couple to said one or plurality of exhaust inlets to receive and pass coolant at least partially through said exhaust manifold and draw heat from said heated combustion gases received therein; and
   a turbocharger arrangement, said turbocharger arrangement having a compressor with an inlet to fluidly couple to said one or plurality of exhaust outlets of said exhaust manifold wherein one or plurality of exhaust outlets of said exhaust manifold fluidly couples to said inlet of said compressor of said turbocharger arrangement without a waste gate.

16. The exhaust manifold of claim 15, wherein said exhaust manifold further comprises a casing, said casing providing said one or plurality of coolant passageways, and wherein said casing is capable of internal operating pressures within said one or plurality of said coolant passageways of 2000 to 5000 pound per square inch (psi).

17. The exhaust manifold of claim 15, wherein said one or plurality of coolant passageways at least partially surrounds said one or plurality of exhaust passageways such that a volume of coolant passing through said one or plurality of coolant passageways draws heat from around an outer diameter of said one or plurality of exhaust passageways.

18. The exhaust manifold of claim 15, wherein said one or plurality of said coolant passageways includes a heatsink structure thermally coupled to said one or plurality of exhaust passageways and said one or plurality of coolant passageways, said heatsink structure to provide a plurality of channels that extend substantially parallel with said one or plurality of exhaust passageways to allow coolant to flow therethrough, and a plurality of thermal communication paths that extend substantially transverse relative to a longitudinal axis of said one or plurality of exhaust passageways.

19. The exhaust manifold of claim 15 further including a coolant reservoir containing super critical $CO_2$ that is in fluid communication with said one or plurality of coolant passageways in said exhaust manifold.

20. A system for temperature control of exhaust gases in an internal combustion engine, said system comprising:
a combustion section defining one or a plurality of combustion chambers that output heated combustion gases;
a coolant reservoir containing coolant and a pump for said coolant;
an exhaust manifold coupled to said combustion section, said exhaust manifold having one or a plurality of exhaust inlets in fluid communication with said one or plurality of combustion chambers to receive said heated combustion gases, and one or a plurality of exhaust outlets in fluid communication with said one or plurality of said exhaust inlets,
wherein said exhaust manifold includes one or a plurality of coolant passageways and said pump is configured to pass coolant at least partially through said exhaust manifold via said one or plurality of coolant passageways and draw heat from said heated combustion gases received via said one or plurality of exhaust inlets;
an engine control unit to receive a first temperature measurement from a temperature sensor disposed at said one or plurality of exhaust outlets of said exhaust manifold, said first temperature measurement representative of combustion gas temperature, and in response to said received temperature measurement exceeding a predetermined threshold, sending a signal to said pump to cause a volume of said coolant to pass through said one or plurality of coolant passageways; and
a turbocharger arrangement, said turbocharger arrangement having a compressor with an inlet to fluidly couple to said one or plurality of exhaust outlets of said exhaust manifold wherein one or plurality of exhaust outlets of said exhaust manifold fluidly couples to said inlet of said compressor of said turbocharger arrangement without a waste gate.

21. The system of claim 20, wherein said coolant reservoir is configured to maintain said coolant at a super-critical state.

22. The system of claim 20, wherein said coolant comprises carbon dioxide ($CO_2$).

23. The system of claim 20, wherein said engine control unit is further configured to send a signal to said pump to cause said exhaust manifold to reduce exhaust energy output by said exhaust manifold.

* * * * *